United States Patent [19]

Wong et al.

[11] Patent Number: 4,674,052

[45] Date of Patent: Jun. 16, 1987

[54] COLLATING AND BINDING SYSTEM AND METHOD WITH POSTAGE INDICATION

[75] Inventors: Did-Bun Wong, Elmhurst; Josef K. Lubenow, Chicago, both of Ill.

[73] Assignee: R. R. Donnelley & Sons Company, Chicago, Ill.

[21] Appl. No.: 668,989

[22] Filed: Nov. 7, 1984

Related U.S. Application Data

[63] Continuation-in-part of Ser. No. 559,398, Dec. 8, 1983, Pat. No. 4,500,083.

[51] Int. Cl.[4] ........................ G06F 15/20; G06G 7/48; B65H 39/02

[52] U.S. Cl. .................................... 364/466; 364/464; 270/54; 270/58

[58] Field of Search ........................ 364/464, 466, 567; 270/54, 58; 377/8; 177/1

[56] References Cited

U.S. PATENT DOCUMENTS

| | | | |
|---|---|---|---|
| 3,819,173 | 6/1974 | Anderson et al. | 270/54 |
| 3,899,165 | 8/1975 | Abram et al. | 270/54 |
| 3,917,252 | 11/1975 | Harder et al. | 270/58 |
| 3,953,017 | 4/1976 | Wise | 270/54 |
| 4,014,784 | 3/1977 | Dunlap | 209/583 |
| 4,046,259 | 9/1977 | Dunlap | 209/583 |
| 4,050,591 | 9/1977 | Dunlap | 209/583 |
| 4,051,913 | 10/1977 | Gudea | 364/466 |
| 4,106,062 | 8/1978 | Foote | 360/15 |
| 4,121,818 | 10/1978 | Riley et al. | 270/54 |
| 4,139,892 | 2/1979 | Gudea et al. | 364/466 |
| 4,170,346 | 10/1979 | Murray et al. | 270/54 |
| 4,326,254 | 4/1982 | Uchimura et al. | 364/464 |
| 4,390,952 | 6/1983 | Dlugos | 364/464 |
| 4,395,031 | 7/1983 | Gruber et al. | 270/54 |
| 4,425,974 | 1/1984 | Kipp | 364/567 |
| 4,462,473 | 7/1984 | Valestin | 364/466 |
| 4,500,083 | 2/1979 | Wong | 364/464 |
| 4,511,793 | 4/1985 | Racanelle | 364/466 |
| 4,516,209 | 5/1985 | Scribner | 364/466 |
| 4,535,419 | 8/1985 | Dlugos et al. | 364/464 |
| 4,569,022 | 2/1986 | Coppola et al. | 364/466 |
| 4,574,352 | 3/1986 | Coppola et al. | 364/466 |

FOREIGN PATENT DOCUMENTS

| | | | |
|---|---|---|---|
| 0015112 | 3/1980 | European Pat. Off. | 364/464 |
| 2066734 | 7/1981 | United Kingdom | 364/464 |
| 2066735 | 7/1981 | United Kingdom | 364/464 |

*Primary Examiner*—Errol A. Krass
*Assistant Examiner*—Danielle B. Laibowitz
*Attorney, Agent, or Firm*—Wood, Dalton, Phillips, Mason & Rowe

[57] ABSTRACT

A collating and binding system for producing customized versions of books includes means for detecting a defective book, means responsive to the detecting means for rejecting the defective book and means for reordering the rejected book at a point in an original production sequence determined in accordance with a comparison of the postal information of the rejected book with the postal information of a book currently being produced. An indication of the postage required to mail the produced books is derived from an amount calculated before the books are produced and from indications of postage increases for those books which were reordered at subsequent portions in the original production sequence.

14 Claims, 9 Drawing Figures

COLLATING AND BINDING SYSTEM AND METHOD WITH POSTAGE INDICATION

CROSS-REFERENCE TO RELATED APPLICATION

This application is a continuation-in-part of application Ser. No. 559,398 filed Dec. 8, 1983, now U.S. Pat. No. 4,500,083, entitled "Collating and Binding System and Method with Postage Indication" and assigned to the assignee of the instant application.

BACKGROUND OF THE INVENTION

The present invention relates generally to collating and binding systems and methods, and more particularly to a system for collating signatures into individual books, arranging the books for efficient mailing and generating an indication of postage therefor.

One prior type of collating and binding system is disclosed in Riley et al U.S. Pat. No. 4,121,818, assigned to the assignee of the instant application. This collating and binding system discloses a plurality of signature feeders disposed adjacent a conveyor, the signature feeders being individually operated by a programmable controller so that customized books are built in accordance with information contained on a magnetic tape. Means are provided along the conveyor to detect defective books. These defective books are removed from the conveyor by a diverter which is operated by the programmable controller.

The above system disclosed in Riley et al is useful to permit customized information and/or signatures to be placed in books produced during a single production run. In other words, each book can be customized for the person to whom it is to be sent.

These books are then collated and bound in a sequence such that the resulting books can be easily bundled to take advantage of postal discounts or to meet Post Office requirements.

The assembling of customized books in a particular sequence to permit bundling according to postal regulations is difficult to achieve in an optimal fashion in the event a defective book is detected, rejected and reordered by the system. In such a case, the Riley et al system compares the mailing information of the defective book with the mailing information of the book adjacent the first signature feeder (or the "most recent book") to determine the optimal time to reorder the book. For example, if the defective book and the most recent book have the same zip code, the defective book can be immediately reordered and grouped with other books having the same zip code to obtain postal discounts. However, if the zip code of the most recent book is different than that of the defective book, then the defective book is reordered following the last book within the same sectional center facility, or SCF, destination. As these examples illustrate, the time for reordering is determined in accordance with a comparison of the mailing information of the defective book with the mailing information of the most recent book on the conveyor.

In some cases when a book is found to be defective and is reordered, the book may no longer qualify for a certain postal discount and may instead be subject to a higher postal rate. For example, a book may be originally classified in a discount classification along with other books to be delivered to the same five digit zip code area. If this book is found to be defective and is reordered at a time such that it no longer is grouped with other books of the same zip code, then this book may not qualify for the discount postage rate previously applicable. The Riley et al system noted above is not capable of generating an indication of the change in postage, if any, caused by the reordering of the defective book.

It may also happen that the reordering of a defective book may cause not only the reordered book to be subject to a higher postal rate but also cause the other books with which the reordered book was originally grouped to be subject to a higher rate, since the remaining books may not meet the minimum requirements, either in terms of number or weight, for the postal discount. The Riley et al system noted above is not capable of generating an indication of the change in postal rate of a group of books as the result of a reordering of one or more books in the group.

SUMMARY OF THE INVENTION

In accordance with the present invention, a collating and binding system includes means for deriving an indication of postage increase caused by the rejection and reordering of defective books. It should be noted that while the present invention is particularly useful with collating and binding systems, in a more general sense it can be used to derive an indication of the postage required to mail items which are gathered by a gathering system.

The collating system of the present invention includes a plurality of signature feeders for delivering signatures to a plurality of stations along a collating conveyor. A computer controls the signature feeders to progressively assemble different groups of signatures on the conveyor and thereby build a series of books in an original or predetermined sequence to take advantage of postal discounts. Means are disposed along the conveyor for detecting a defective book and means responsive to the detecting means reject the defective book at a point downstream from the signature feeders.

The collating system further includes means for reordering the rejected book at a point in the sequence determined in accordance with a comparison of the postal information of the rejected book with the postal information of a book on the conveyor, typically the current or most recent book being assembled by the system. The computer generates an indication of the incremental increase in postage for the reordered book based upon the point in the sequence at which the defective book was reordered and adds this increase to a precalculated indication of such postage computed before the collating and binding has begun.

Means are included for generating an indication of the incremental increase in postage for a grouping of books which originally qualified for a postal discount, but which no longer qualify due to the reordering of one or more books in the group.

Also provided are means for reordering a defective book, which book originally qualified for a postal discount, at a point in the sequence which qualifies the book for another postal discount or, if this is not possible, at a point in the sequence which causes the book to be classified in the highest postal rate category.

DESCRIPTION OF THE PREFERRED EMBODIMENT

Figure 1:
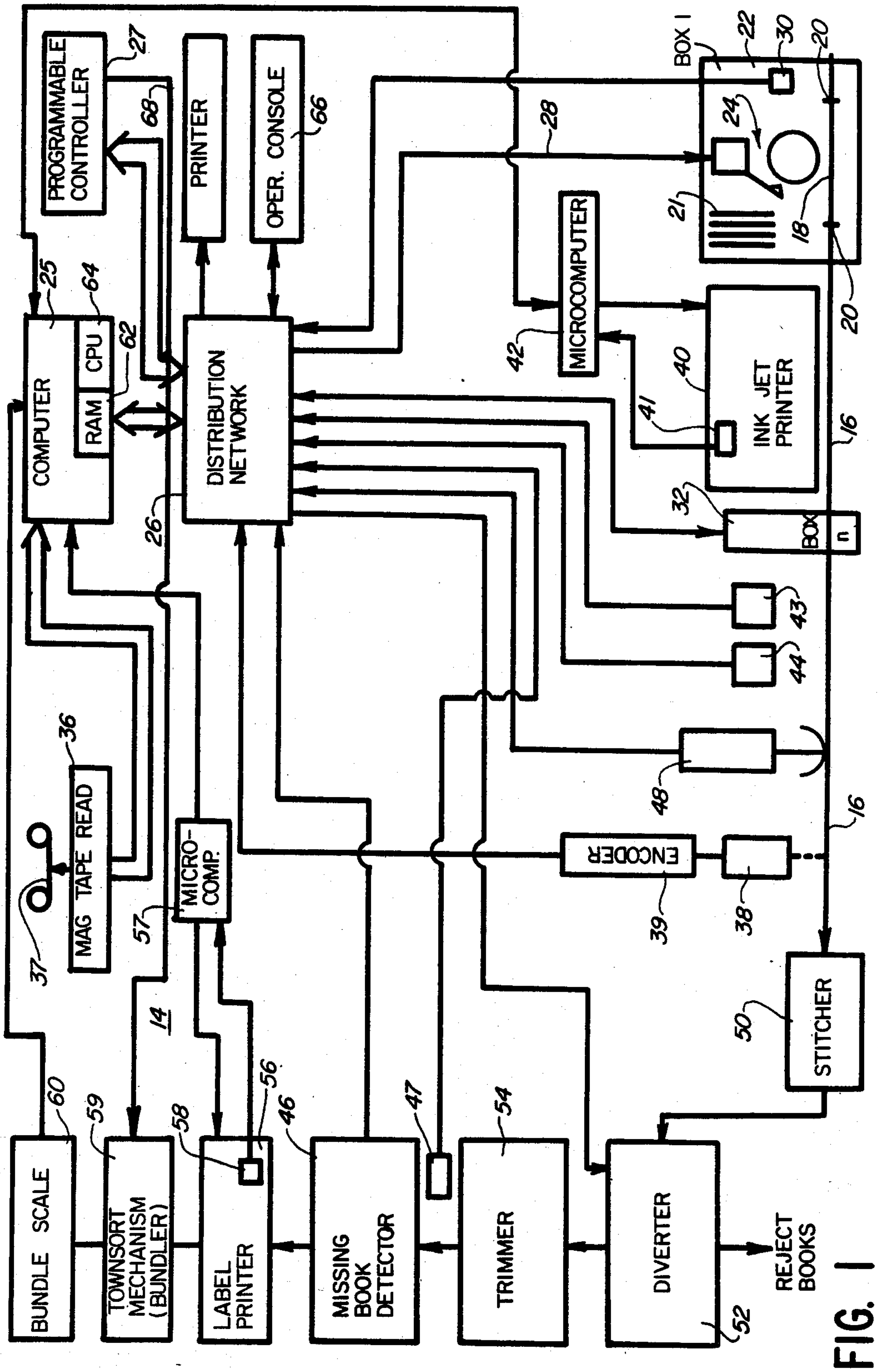
FIG. 1 is a block diagram of a signature collating and binding system according to the present invention.

Referring now to FIG. 1, a signature collating and binding system 14 is disclosed, such system being preferably of the type disclosed in Riley et al U.S. Pat. No. 4,121,818, assigned to the assignee of the instant application and the disclosure of which is hereby incorporated by reference. The description of the Riley et al system in this application is limited to those portions which are pertinent to an understanding of the present invention, it being understood that a more complete description may be had by reference to the above-identified patent.

The system 14 includes a conveyor 16 having a plurality of stations, such as station 18, each station being separated from other stations by pusher pins shown schematically at 20. The station 18 is illustrated as being positioned to receive a signature 21 stored in a first signature feeder box 22. The feeder box 22 includes feeder apparatus 24 selectively operated by a main computer 25 through a distribution network 26. The feeder apparatus 24 is disclosed in the above-mentioned Riley et al patent and reference may be had thereto for a full description. At this point, it need only be mentioned that the signature 21 may or may not be placed on the conveyor 16 at the station 18 depending upon the state of a signal on a line 28 from the distribution network 26.

The first signature feeder box 22 also includes a detector 30 which detects when a signature has been placed on the conveyor 16. The output from the detector 30 is coupled to the computer 25 through the network 26.

Second through nth signature feeder boxes are also disposed along the conveyor 16, only the nth box 32 being shown schematically for purposes of simplicity. Each of the second through nth signature feeder boxes is essentially identical to the first feeder box 22, the feeding of signatures by the boxes being individually controlled by the main computer 25. The computer 25 in turn receives information from a magnetic tape reader 36 which senses information stored on a magnetic tape 37 regarding the particular signatures to be assembled for each book. As noted in the above-mentioned Riley et al patent, different versions of books may be built at different stations of the conveyor 16 by controlling the feeding of signatures by each of the feeder boxes.

A programmable controller 27 is also coupled to the distribution network 26 and is capable of controlling various book-processing apparatus noted more specifically below.

The conveyor 16 is driven by a chain motor 38 and information regarding the position of the stations of the conveyor 16 is developed by an encoder 39 and is coupled to the distribution network 26.

A non-contact printer, such as an ink jet printer 40, is disposed between the first and nth signature feeder boxes at a point which permits ink jet printing of customized information under control of the computer 25 on one or more signatures. The ink jet printer 40 includes a detector 41 which detects whether the printer is operating correctly. A microcomputer 42 controls the printer 40 in response to commands from the computer 25.

Alternatively, the ink jet printer 40 may be located at another point, as desired.

Also disposed along the length of the conveyor 16 is means for detecting a defective book. One of these means is the detector 41 in the ink jet printer 40 described above. Other means include a long book detector 43, a hanging signature detector 44, a missing book detector 46 and a square book detector 47, the last two being located farther downstream adjacent the conveyor 16. A caliper 48 may additionally be utilized to check the thickness of each book on the conveyor 16. The caliper 48 is adjusted to provide a defective book indication to the distribution network 26 and the computer 25 when the thickness of the book measured thereby is outside of a predetermined range.

A stitcher 50 binds the assembled books after measurement by the caliper 48. A diverter 52, under control of the programmable controller 27 rejects defective books by removing same from the conveyor 16. A trimmer 54 then cuts the bound books to size and a label printer 56, which may be a second ink jet printer, operated by the computer 25 and a microcomputer 57, prints mailing information on the outside of the completed book. The label printer 56 may also have a detector 58 incorporated therein to determine whether the printer is operating satisfactorily. For example, bundling apparatus in the form of a town sort mechanism 59 groups the books into bundles, with each bundle being weighed by a bundle scale 60 which may be utilized to verify that bundle weights are within a required range established by the postal service. The town sort mechanism 59 is coupled to the programmable controller 27 and is controlled thereby to satisfy postal requirements and/or to take advantage of postal discounts. The indication of bundle weight provided by the bundle scale 60 is provided to the computer 25 which checks to determine whether the bundle weight is within limits imposed by the postal service, as noted more specifically below.

Following the bundle scale 60, additional processing may be performed as desired.

The computer 25 includes a random access memory, or RAM 62 and a central processing unit, or CPU 64. The RAM 62 contains the control program described in later portions of this specification and may additionally store incremental postal rates, as later noted. The RAM 62 also stores various intermediate results of calculations performed by the CPU 64 and information from the magnetic tape reader 36 indicating the makeup of each book to be produced during a production run, the address to which the completed book is to be sent and other information.

An operator console 66 acts as an interface between an operator and the collating system. The computer 25 may also operate a printer 68 to inform a user of various operating conditions in the collating system. For example, the computer 25 may operate the printer 68 to print a postage report for the assembled books, as noted more specifically below.

The collating system may include additional elements, such as a replacement book feeder which replaces missing books with a standard book, or other elements as desired. The replacement book feeder is disclosed in Abram et al U.S. Pat. No. 3,899,165 and in the above-noted Riley et al patent and reference should be made thereto for a full description.

The order in which the books are to be produced is derived from mailing lists provided by the customer so that advantage is taken of discounts offered by the Postal Service. The postage is then calculated and this precalculated indication of total postage and the rate category for each book to be produced is stored on the magnetic tape 37. The current postal rate structure for bulk business mail and the postal bundling requirements, are illustrated in a pamphlet published by the Graphic Communications Association of Arlington, Va. entitled "Specifications Manual PASS: Package and Sack/Skid Sequencing for Publications Mailings" May, 1984, which is hereby incorporated by reference. The rate structure, as illustrated at pages 20, 21 and pages 44, 45 of this pamphlet, for second and third class mailings is as follows:

| | 2nd Class | | 3rd Class | |
|---|---|---|---|---|
| Category | # of Pieces Required | Postal Rate Level | # of Pieces or Weight Required | Postal Rate Level |
| Carrier Route | 6 or more | C (lowest rate) | 10 or more pieces | CAR RT (lowest rate) |
| 5 Digit Zip Code | 6 or more | B (intermediate rate) | 50 pieces or 10 lbs. | 5-DIGIT (intermediate rate) |
| Mixed Directs | — | — | Multiple 5-digit zip packages destined for the same unique 3-digit zip city | 5-DIGIT (intermediate rate) |
| City or Unique 3 Digit City | 6 or more | B (intermediate rate) | 10 or more pieces | BASIC (highest rate) |
| 3 DIGIT Zip Code | 6 or more | A (highest rate) | 10 or more pieces | BASIC (highest rate) |
| SCF | 6 or more | A (highest rate) | 10 or more pieces | BASIC (highest rate) |
| IF BUNDLES ARE TO BE SACKED: | | | | |
| Common State | 6 or more | A (highest rate) | 10 or more pieces | BASIC (highest rate) |
| Mixed States | left over | A (highest rate) | left over | BASIC (highest rate) |
| IF BUNDLES ARE TO BE PALLETIZED: | | | | |
| SDC | 6 or more | A (highest rate) | 10 or more pieces | BASIC (highest rate) |

A typical second class piece of mail is a magazine while a typical third class item is a catalog.

In terms of second class mailings, a bundled group of 6 or more pieces to the same carrier route qualifies for the lowest postal level rate C, while a bundled group of six or more pieces to the same 5-digit zip code qualifies for an intermediate postal rate level B. The remaining groupings, for example the 3-digit zip code category (referring to the first three digits of the 5-digit zip code) where six or more books are grouped together each having a common 3-digit zip code prefix, qualify for the basic (or highest) postal rate A.

Similarly, for third class mailings, ten or more pieces bundled together by carrier route qualifies for the lowest postal rate level CAR RT, while groupings of 50 or more books, or 10 pounds or more of books, having a common 5-digit zip code qualify for the intermediate rate 5-DIGIT. Also qualifying for the intermediate rate are mixed directs, which are multiple 5-digit zip code packages destined for the same unique 3-digit city (not applicable to second class). The remaining categories qualify for BASIC (or highest) rates, similar to that described with respect to second class.

It should be noted that, in the case of third class mailings qualifying for the intermediate rate, there is a maximum weight which can be grouped as a bundle or package, the maximum weight being determined by the postal service.

For either class, the bundling requirements differ for bundles qualifying for the highest rate depending upon whether the bundles are to be assembled into a sack or are to be palletized. If the former, the bundles are categorized into common or mixed states while if the latter, the bundles are categorized into the SDC (or State Distribution Center) category.

As noted above, the magnetic tape 37 contains for each book to be produced information as to the makeup of the book in terms of which signatures are to be included therein and information regarding the person and mailing address to which the book is to be sent. This information may be arranged sequentially on the magnetic tape 37 so that the finished books exit the conveyor ready to be bundled into groups which qualify for the postal rate discounts.

This grouping of books can result in substantial postal savings to the customer. However, when a book originally qualifying for a postal discount is found to be defective on the conveyor and is rejected by the diverter 52, and it is too late to reorder the same book so that it can be grouped with its original grouping, then the reordered book may not qualify for the discount. Accordingly, the precalculated indication of postage required may become erroneous.

Furthermore, a defective book which cannot be reordered so that it is still grouped with its original grouping of books may cause the entire original grouping to drop below the minimum level necessary to qualify at a particular postal rate. For example, if a defective book in a second class mailing was originally grouped with five other books all addressed to the same carrier route and if the defective book could not be reordered to maintain its grouping with the remaining five books, then all six of the books, (i.e. the defective book plus the five other books with which it was grouped), cannot qualify for postal rate level C but instead must be mailed at a higher postal rate level B or A. Such a grouping of books is referred to a "degenerated" bundle or package since the entire grouping has dropped from one postal rate classification to another, i.e. from the lowest rate to either of the intermediate or highest rates or from the intermediate rate to the highest rate.

In the case of a reorder of a defective book which originally qualified for the lowest rate and which cannot be reordered in time to preserve its original discount classification, there is the additional problem of determining whether or not the book can be reordered so as to qualify for the intermediate rate or whether it must be mailed at the highest rate. This problem arises due to the requirement that bundles or packages must include a minimum number of items or a minimum weight in order to qualify for the intermediate rate. Hence, for each reordered book which originally qualified for the lowest rate and which cannot be grouped with its original bundle or package, a determination must be made as to whether it is possible to reorder the book at a point in the sequence which would permit the book to be grouped with other books which already qualify for the intermediate rate or whether the book must be mailed at the highest rate.

The above problems can be particularly acute where the books are "customized" in the sense that not all of the books produced during a single production run are identical. Customization can result from signatures being included in some books but not in others, ink-jet printing of specialized messages (such as addressee name) on one or more signatures, insertion of subscription cards in some books but not others or any other manufacturing step which is selectively performed on less than all of the books in a production run so that not all books are alike. In fact, two or more different publications might be produced during the course of a single production run, and hence these books are appropriately considered "customized" as well.

Where a customized book is found to be defective and is rejected, the next book in the collating sequence cannot simply be substituted therefor to make up the deficiency since the two books are most likely not identical. Therefore, the customized book must be reordered.

In order to generate an indication of postage for a defective book which is reordered, the computer 25 is programmed to reorder the defective book at an appropriate point in the original collating sequence to take advantage of postal discount rates. An indication of the increase in postage, if any, for the reordered book is then generated by the computer 25 based upon the point in the collating sequence at which the book was reordered.

Figure 2:
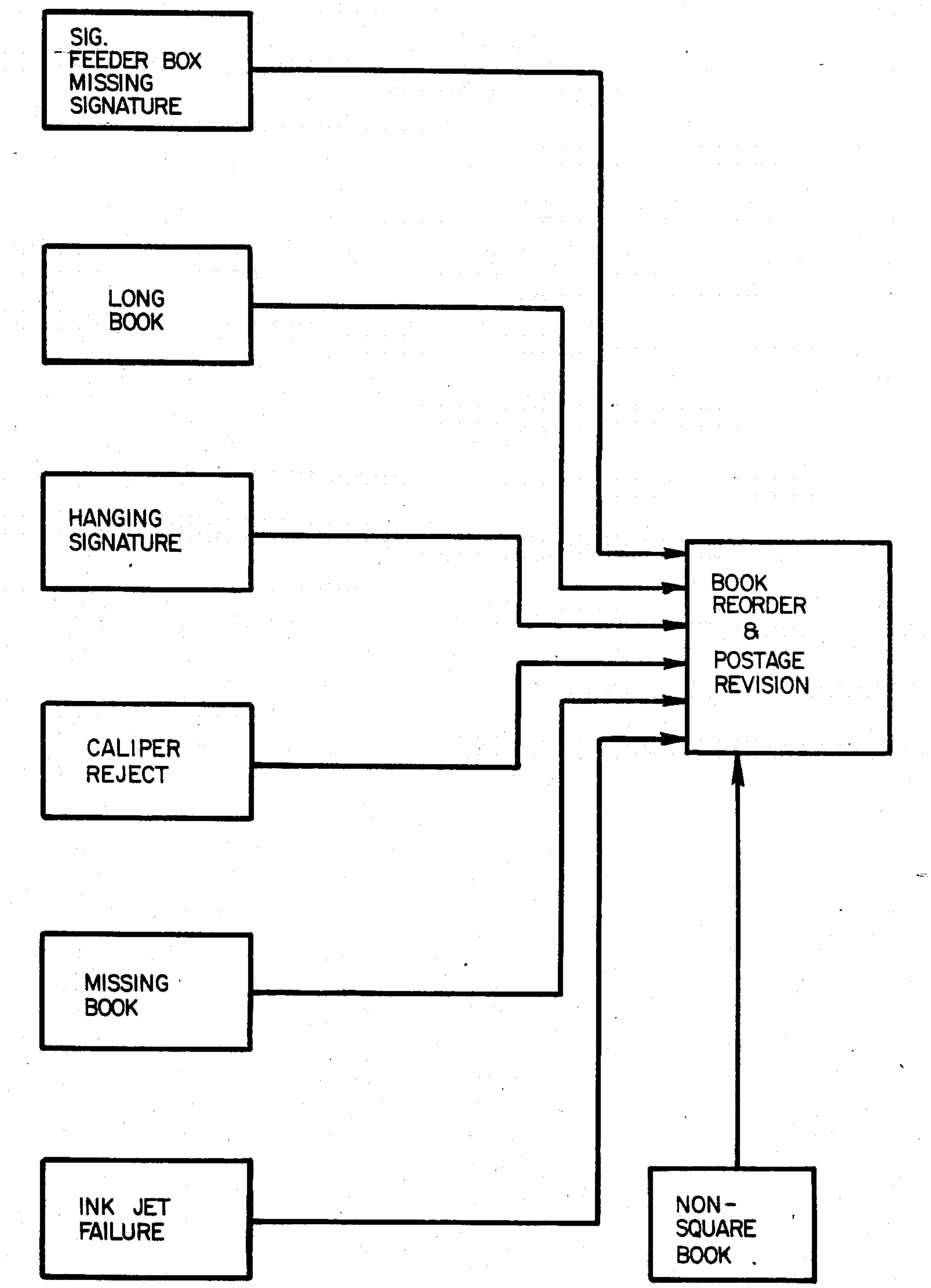
FIG. 2 is a generalized block diagram of the control program stored in the computer shown in FIG. 1.

Referring also to FIG. 2, the book reorder and postage revision program stored in the computer 25 is accessed by any one of a number of interrupts generated by the computer 25 or the programmable controller 27. The computer or controller generates an interrupt whenever a signal is generated by one of the defective book detecting means. For example, if a failure has occurred in an ink jet such that the printer 40 fails to print a satisfactory message on a signature, the computer 25 receives the signal from the detector 41 in the printer 40 and generates the interrupt to cause the computer 25 to reorder the book at an appropriate time and generate an indication of the increase in postage for that piece of mail.

In a similar fashion, an indication of a defective book provided by the detectors 30,43,44,46,47 and a thick/-thin-book indication from the caliper 48 causes an interrupt to be transmitted to the computer 25.

Figure 3A:
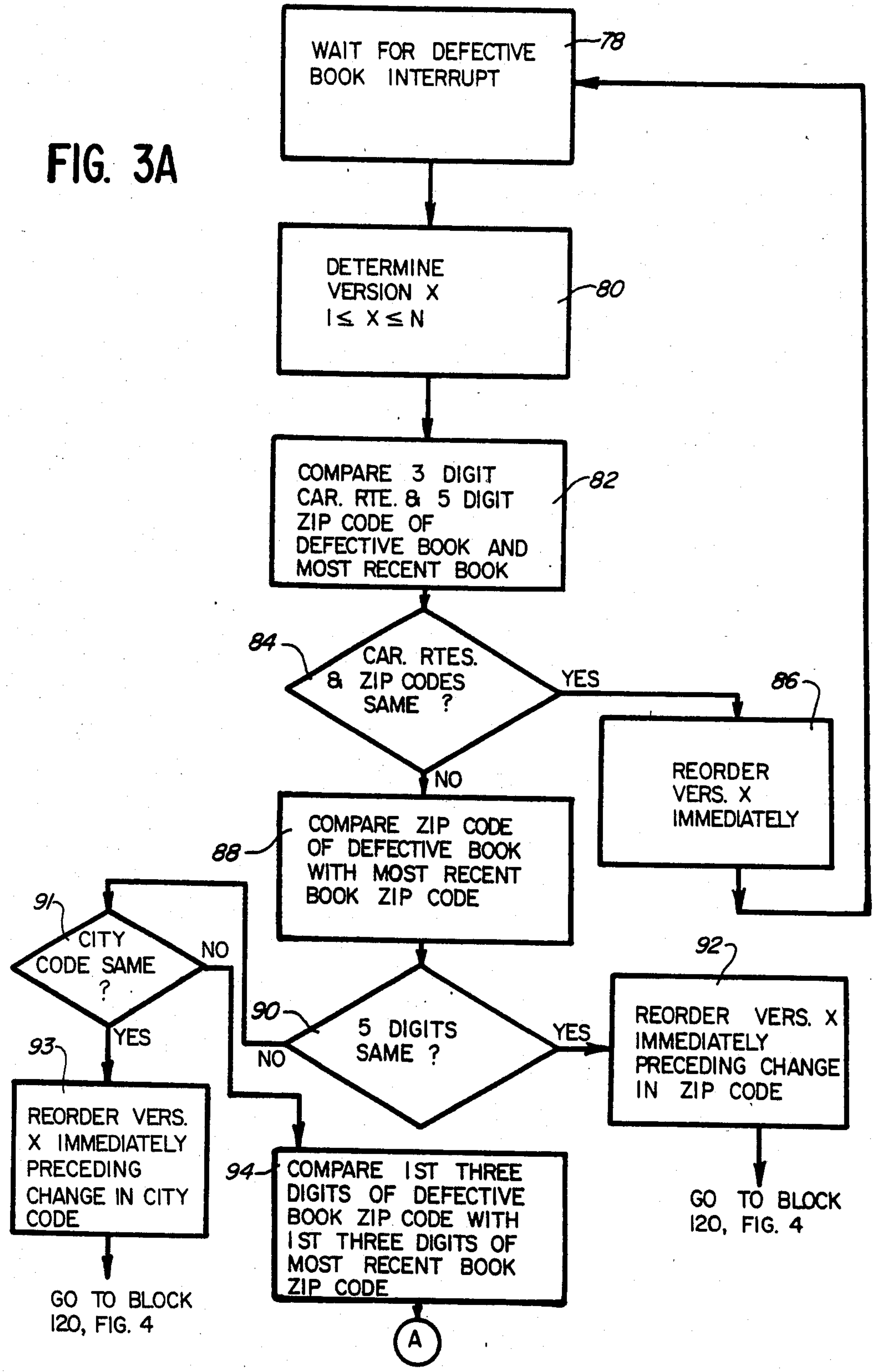
FIGS. 3A and 3B, when joined along similarly lettered lines, comprise a flow chart of the book reordering control program stored in the computer shown in FIG. 1.
Figure 3B:
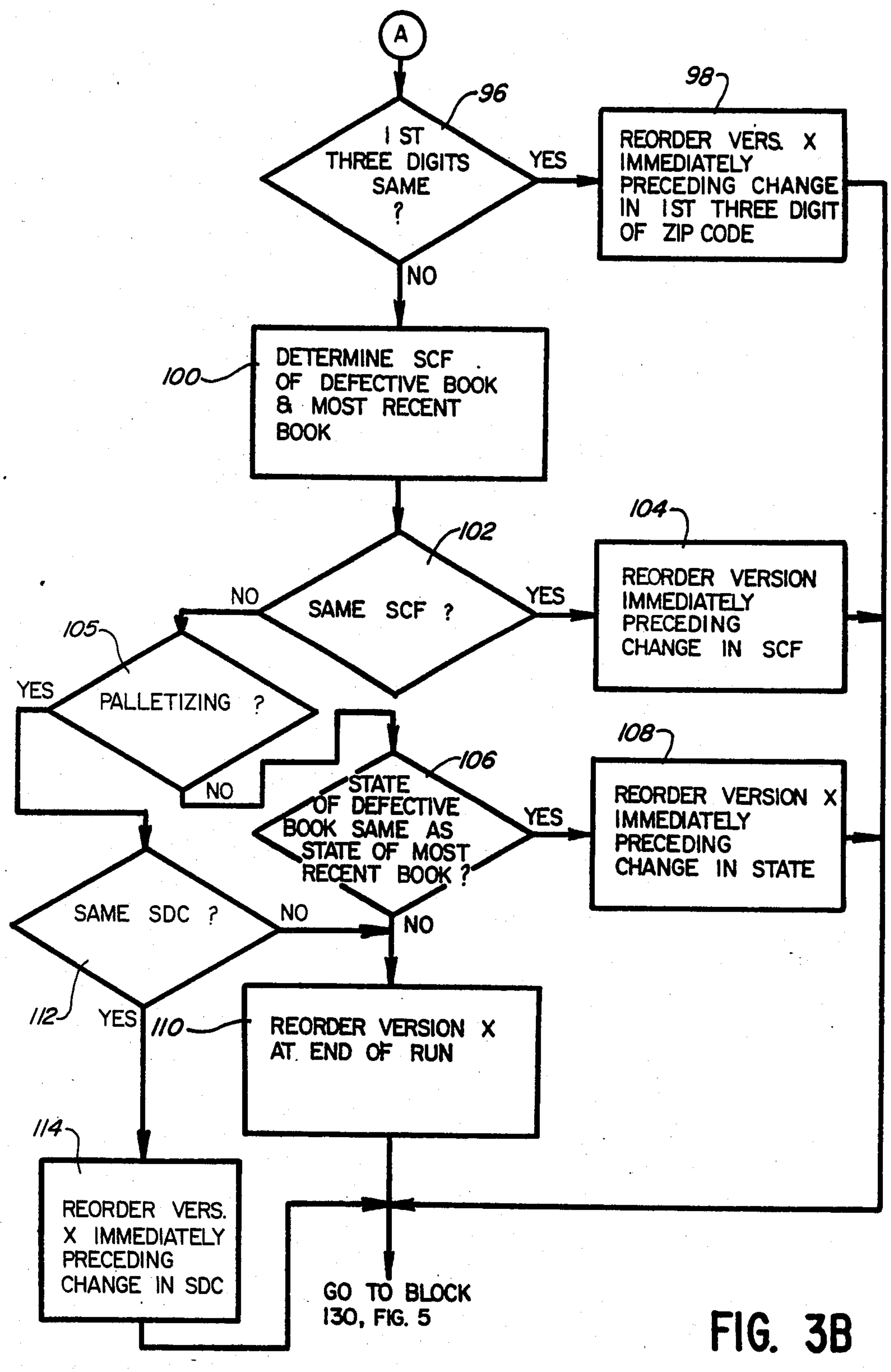

Referring now to FIGS. 3A and 3B, there is illustrated a portion of the programming in the computer 25 which determines the appropriate point in the original sequence to reorder a book found to be defective. The postal information of the defective book is compared with the postal information of the most recent book on the conveyor to determine which parts of the postal information for these books match and the defective book is immediately reordered or is reordered later in the sequence prior to a change in one of the matching parts of the postal information.

The "most recent" book is that book in the process of being assembled which is currently adjacent the first signature feeder box 22. In other words, the most recent book as seen in FIG. 1 is typically that book which is eventually assembled on the station 18.

As seen in FIG. 3A, following the receipt of a defective book interrupt generated as previously noted, a block 80 determines the version of the defective book. As previously noted, each book may be different from or the same as other books in the production run depending upon the makeup of the book in terms of which signatures are fed to the appropriate station on the conveyor. As previously noted, this book makeup information is initially stored on the magnetic tape 36. During production the information for each book is read into the RAM 62 of the computer 25 in a fashion identical to that disclosed in connection with FIGS. 10 and 11 of the Riley et al patent. For purposes of discussion in this application, it will be assumed that the version may be any one of N versions to be produced by the collating and binding system.

A block 82 then compares the 3-digit carrier route and 5-digit zip code designations of the defective book with the same information of the most recent book being assembled on the conveyor. If the carrier routes and zip codes of these books are the same, then a block 86 stores the book information for the defective book in the RAM 62 so that this book is assembled immediately following the most recent book. The defective book is therefore reordered so that it can be grouped with the other books having the same carrier route and zip code mailing information.

In the event that the carrier route and zip code information are not identical, then a block 88 compares only the 5-digit zip code of the defective book with the most recent book zip code. If it is found that the 5-digit zip codes are identical, a block 92 causes version X to be reordered immediately preceding the first book having a zip code different than the zip code of the books currently being assembled. Following the block 92, control passes to a block 120 in FIG. 4 where the indication of increase in postage for the defective book is generated. This is necessary since the book can no longer be grouped with other books having the same carrier route and zip code information, and hence this book cannot be mailed at postal rate C (for second class) or at the CAR RT rate (for third class mail). Instead this book must be shipped at a higher postal rate.

Following the block 90, a block 91 checks to determine whether a city code stored on the tape 37 for the defective book and the most recent book are the same. If this is the case, control passes to a block 93 which reorders the defective book immediately preceding a change in the city code. Control then passes to the block 120, FIG. 4.

It should be noted that the city code indicates whether a finished book is to be mailed at the intermediate rate providing that it is produced and grouped in the original sequence. In other words, the city code indicates whether the book originally qualified under the 5-digit zip, city or unique 3-digit city categories (if second class) or the 5-digit zip or mixed direct categories (if third class). The city code is distinct from and should not be confused with the city category.

If the city codes of the defective and most recent books are not the same, a block 94 compares the first three digits of the zip codes of these books to determine whether the books should be grouped in the 3-digit category. If these first three digits are identical, a block 98 causes version X to be reordered immediately preceding a change in the first three digits of the current zip code.

Following the block 98, control passes to a block 130, FIG. 5, which generates the indication of postage increase, if any, for this book. This is necessary since this book now qualifies for the highest postal rate whereas it previously may have qualified for a lesser rate.

If it is determined that the first three digits of the zip code are not the same, then a block 100 determines the sectional center facility, or SCF, of the defective book and the most recent book. This is accomplished by utilizing the zip code information for each book to access a lookup table containing SCF identifications. A block 102 then compares the SCF designations for the defective book and most recent book. If the SCF designations are identical, a block 104 causes version X to be reordered immediately preceding a change in the SCF from that associated with the books currently being produced.

If it is found that the SCF designations are not identical, a block 105 determines whether the finished bundles are to be palletized. This information may be manually entered into the computer 25 or may be stored on the tape 37. If the bundles will not be palletized, a block 106 compares the state information of the defective book with that of the most recent book. If the books are to be mailed to the same state, a block 108 causes version X to be reordered immediately preceding a change in such state.

If the block 106 determines that the books are not to be mailed to the same state, then the book is to be grouped with books from other states, and hence version X is reordered at a later point in the sequence such as at the end of the production run.

If the block 105 determines that the bundles are to be palletized, a block 112 determines whether the defective book and the most recent book have the same SDC designation, such information being stored on the tape 37. If this is the case, version X is reordered immediately preceding a change in the SDC designation. Otherwise, version X is reordered by the block 110.

Control from each of the blocks 104,108,110,114 passes to the block 130, FIG. 5, previously mentioned.

It should be noted that a change in 5-digit zip code, city, 3-digit zip code, SCF, SDC (if palletizing) or state (if sacking) may be indicated by flags in the RAM 62 or may be accomplished by other means, as desired.

The net result of the program shown in FIGS. 3A and 3B is to cause the original collating sequence to be changed to a revised sequence due to the reordering of defective books. Control then passes to the postage revision program shown in FIGS. 4 and 5.

It should be noted that the point at which the defective book is reordered may be determined in accordance with a comparison of the postal information of the defective book with another book on the conveyor which is not the most recent book. For example, assume that there are 23 signature feeders positioned adjacent the conveyor at positions 1–11 and 13–24 such that position 1 is occupied by the box currently feeding to the most recent book and, position 24 is occupied by the last box to feed signatures to the conveyor stations. Also assume that an ink jet printer occupies position 12 and that a series of customized books are to be produced wherein the customization is due solely to the message printed by the ink jet printer (i.e. all books have the same signature makeup). If a detector downstream of the ink jet printer determines that no signature was fed by one or more of the boxes at positions 13–24 where a signature should have been fed, then the postal information of the defective book is compared against that of the book adjacent the box at position 11. If the zip code and carrier route designations of these two books match, then the message for the defective book is applied on the book currently adjacent position 11 so that the defective book is reordered. This is possible since each book will eventually have the same signatures contained therein. The customized messages for the remaining books in the production sequence are applied on later books after the message for the defective book has been printed.

On the other hand, if the carrier route and zip code designations for the defective book and the book adjacent position 11 are not both the same, the postal information of the defective book might be compared against that of all or only some of the books adjacent positions 1–10 to determine the optimal reorder time.

Figure 4:
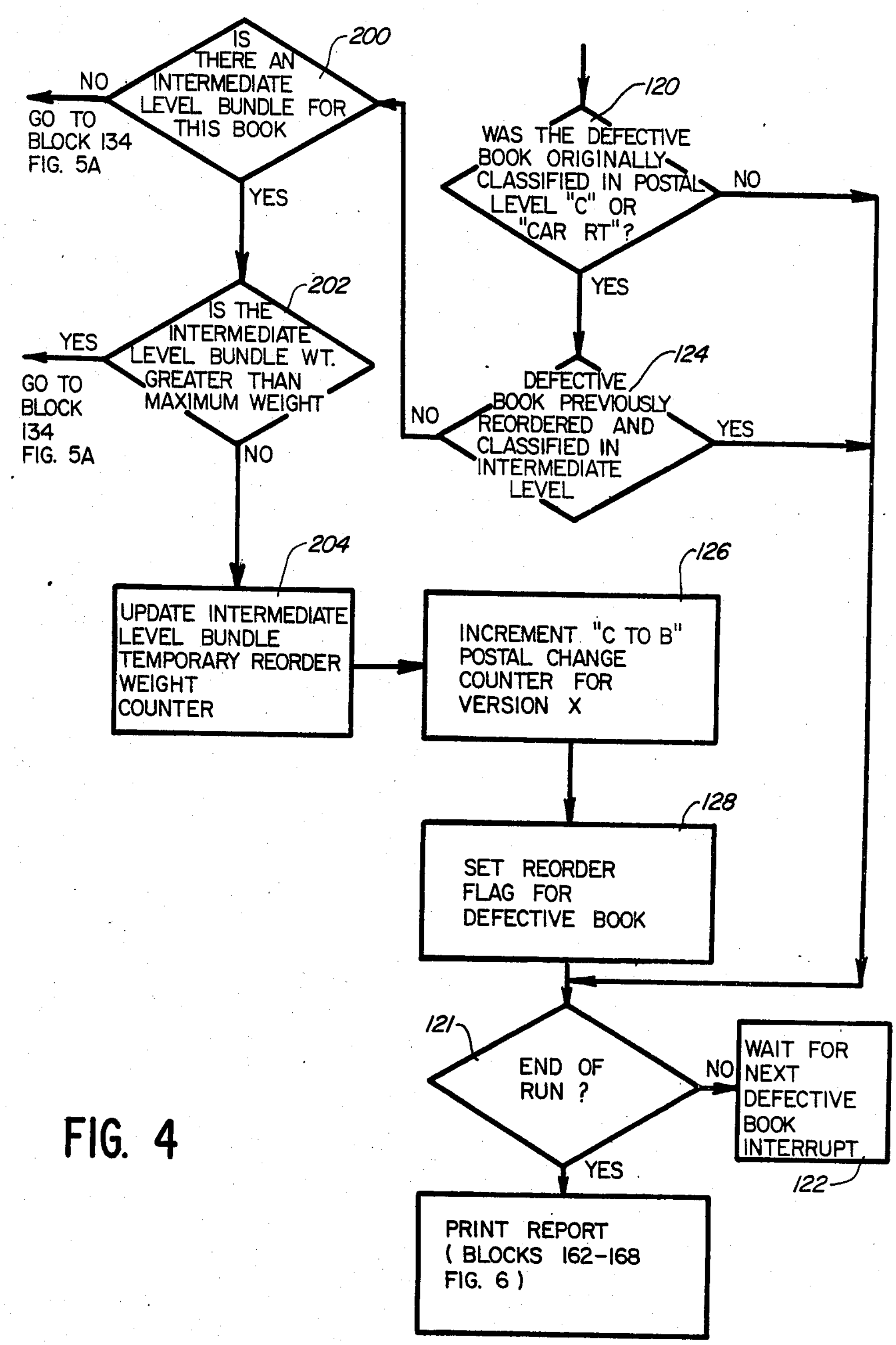
FIGS. 4, 5A and 5B are flow charts of the postage revision control program stored in the computer of FIG. 1.

Referring now to FIG. 4, following the block 92 of FIG. 3A, the block 120 determines whether the defective book was originally classified in lowest postal level C or CAR RT. In other words, the block 120 determines whether the defective book which was originally classified with either more than six (if second class) or ten (if third class) other books having the same carrier route and zip code designations. If this is not the case, then the book was originally classified in the intermediate postal rate category and hence no adjustment to postage need be made. Accordingly, control passes through a block 121 to a block 122 if the run is not yet complete where control pauses until the next defective book interrupt is received.

If it is determined that the defective book was originally classified in postal level C or in the CAR RT classification, then a block 124 checks to determine whether the defective book was previously reordered and classified in the intermediate postal rate category. This is accomplished by checking a flag in the RAM 62, as noted more specifically below. If this is the case, then the defective book was originally classified in the lowest postal rate classification, and subsequently was reordered in the intermediate postal rate classification and the indication of postage increase already generated. Accordingly, no further postage revision is required and hence control passes to the block 121.

If the block 124 determines that the defective book has not been previously reordered and that it has been reclassified in the intermediate postal level, then a block 200 checks to determine whether or not there is a bundle or package which qualifies for the intermediate rate with which the reorder book can be grouped so as to also qualify for the intermediate rate. This information is determined by checking a register in the RAM 62 which is loaded with information initially provided on the magnetic tape 37. It should be noted that the tape 37 also loads registers in the RAM 62 with information identifying the bundle with which the reordered book was originally grouped and the number of books in such group. These last two items of information are important to identify degenerated bundles as noted more specifically below.

Figure 5A:
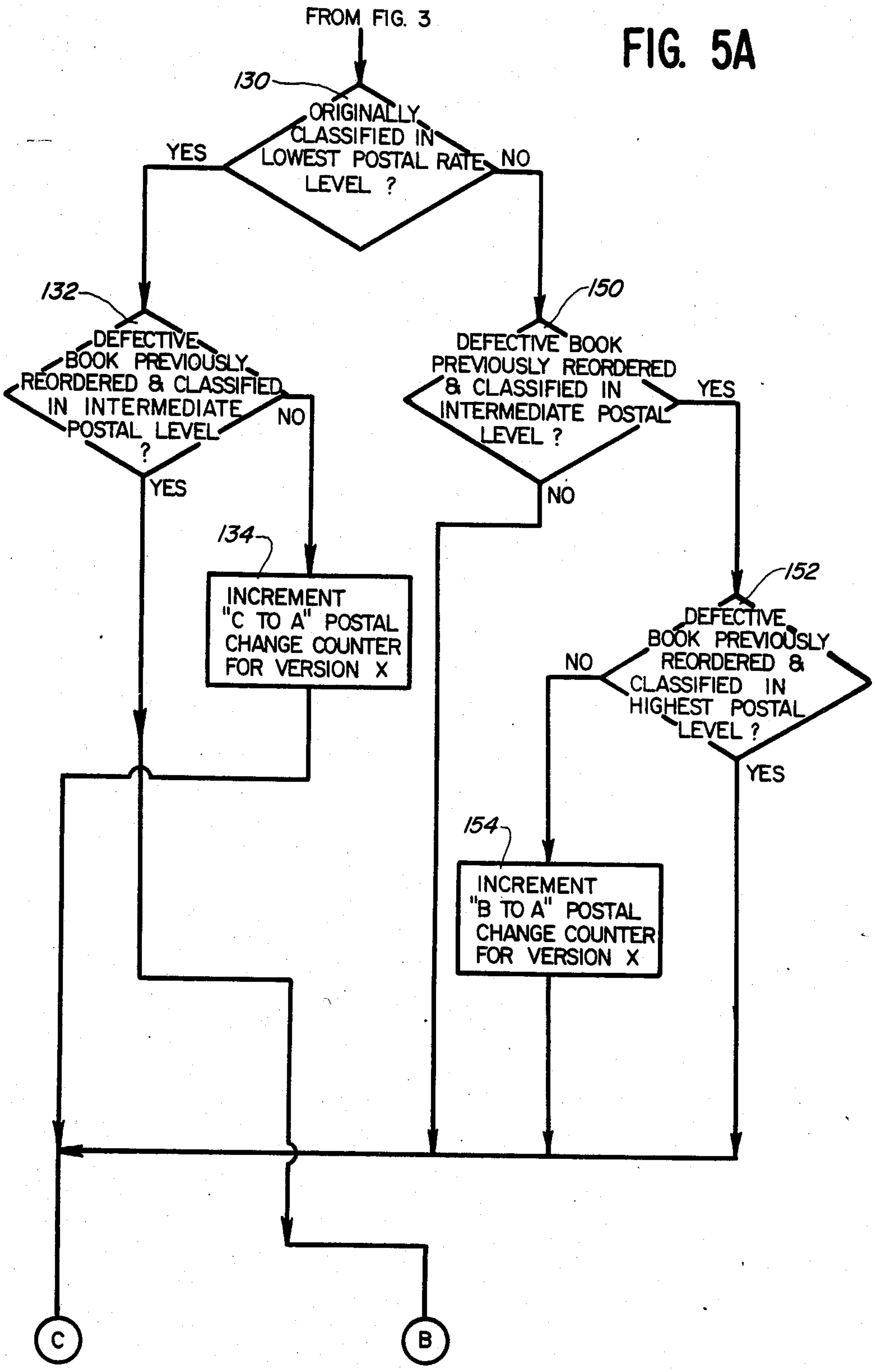

If the block 200 determines that there is no intermediate level bundle with which the reordered book can be grouped, then the book must be reordered at the highest postal rate category and hence control passes to a block 134, FIG. 5A, which initiates recalculation of the postage required for the book. On the other hand, if the block 200 determines that there is an intermediate level bundle with which the reordered book can be grouped so it also obtains the intermediate rate, then control passes to a block 202 which checks the contents of a register in the RAM 62 containing an indication of the weight of the bundle with which the reordered book is to be grouped. This value is manually entered into the system or is initially loaded from the magnetic tape 37 and is utilized to determine whether, in a third class mailing, the bundle weight, as augmented by the weight of the reordered book, would exceed a maximum weight for the intermediate rate category. If the bundle weight is determined to be greater than the maximum that can be mailed at the intermediate rate, then the reordered book must be mailed at the highest postal rate and hence control passes to the block 134, FIG. 5A.

On the other hand, if the bundle weight does not exceed the maximum even with the addition of the reordered book, then control passes to a block 204 which updates the contents of the bundle weight register. A postal change counter designated "C-to-B" for version X is also incremented, such counter being contained within the RAM 62 shown in FIG. 1. There is a different "C-to-B" counter for each version to be produced in the run.

It should be noted that an indication of the weight of each book can be generated by various means, such as by utilizing an average weight for each book, an indication generated by multiplying the calipered thickness of the book times an average weight per page or any other means which generates some reliable indication of book weight. As previously noted, this information is stored in the RAM 62 to permit the determination by block 202 as to whether the bundle weight exceeds the specified maximum.

Further, in the case of mailings in a class other than third class which do not have maximum weight limits for the intermediate postal rate category, the block 202 would not be utilized and control from the block 200 would proceed directly to the block 204 in the event that there is an intermediate level bundle with which the reordered book can be grouped.

Following the block 126, a block 128 sets a flag in the RAM 62 indicating that the defective book has been reordered. This information is important since it may occur that the reordered book itself may later be found to be defective, in which case block 124 is again encountered to check the status of this flag.

Figure 5B:
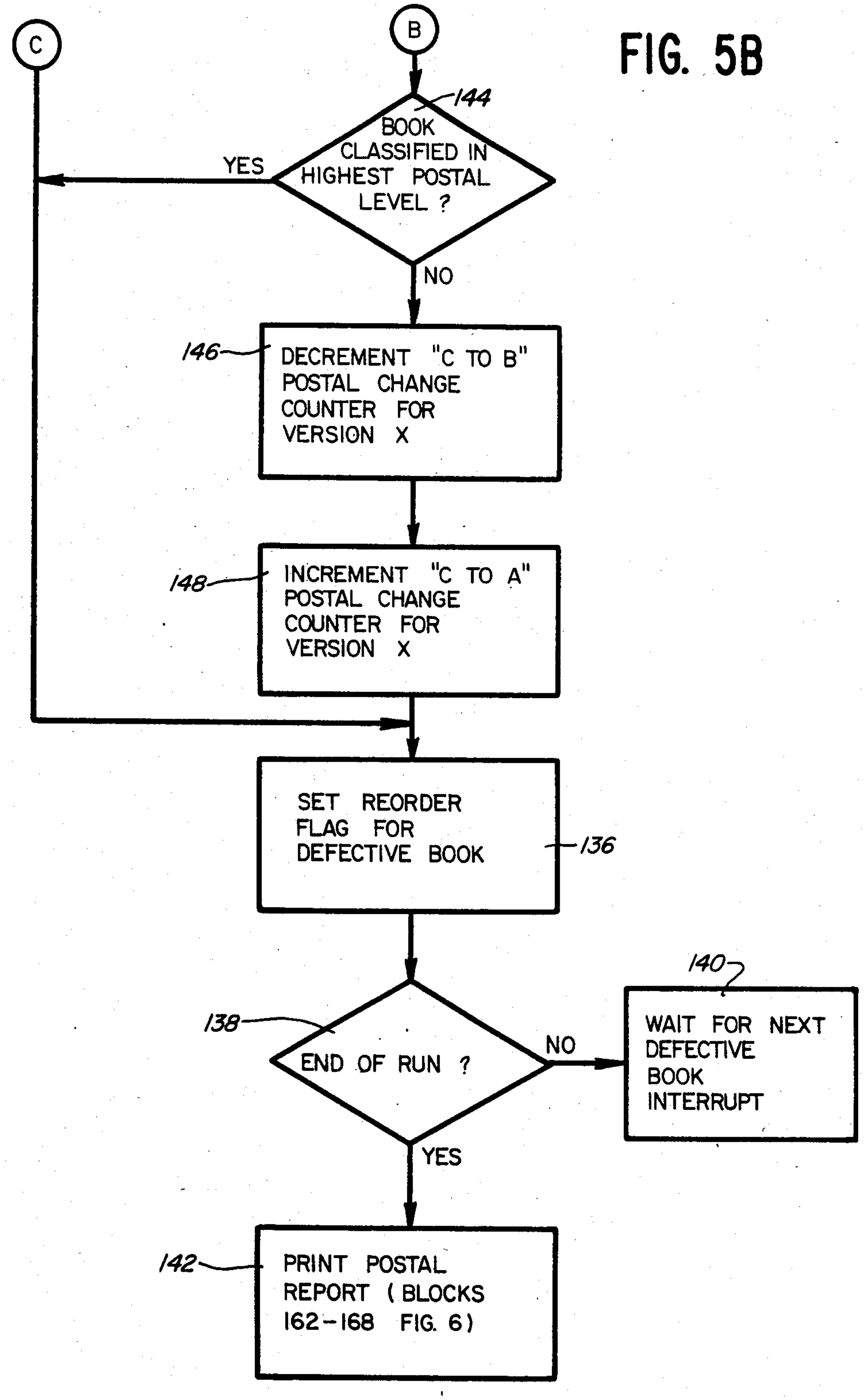

Referring now to FIGS. 5A and 5B, immediately following the blocks 98,104,108,110,114 in FIG. 3, the block 130 checks to determine whether the defective book was originally classified in the lowest postal rate level. If this is the case, then a block 132 checks to determine whether the defective book was previously reordered and classified in the intermediate postal rate classification. This is accomplished, similar to the block 124 described in FIG. 4 by checking the reorder flag for the defective book in the RAM 62. If this is not the case, then a postal change counter designated "C-to-A" in the RAM 62 is incremented since the defective book originally qualified for the lowest postal rates, but could not be ordered in time to qualify for either the lowest or intermediate rates.

Following the block 134, control passes to a block 136, FIG. 5B, which sets the reorder flag for the defective book. A block 138 then checks to determine whether the entire production run has been completed. If this is not the case then control pauses at a block 140 until the next defective book interrupt is received.

On the other hand, if the block 138 determines that the run has been completed, a block 142 prints a postage report, to be described in greater detail in later portions of the specification.

If the block 132, FIG. 5A, determines that the defective book had previously been reordered at the intermediate postal rate level, then a block 144 checks to determine whether the defective book and the reordered book are both classified in the highest postal rate classification. In other words, this block checks to determine whether the book is being reordered at the highest postal rate, when it was previously reordered also at the highest postal rate. If this is the case, then no adjustment to postage need be made and control passes directly to the block 136 previously described.

On the other hand, if the block 144 determines that the defective book was classified in the intermediate postal rate level and is now being reordered in the highest postal rate level, then a block 146 decrements the "C-to-B" postal change counter for version X and a block 148 increments the "C-to-A" postal change counter for version X. This is necessary since the book has been twice reordered, each time at a higher rate, i.e. the book originally qualified for the lowest postal rates, then was reordered at the intermediate postal rate and finally was reordered at the highest postal rate. Accordingly, the bookkeeping is kept accurate by simply noting that the book is subject to an incremental increase in postage from the lowest to the highest rates and by deleting the incremental increase from the lowest to the intermediate rates. Following the block 148, control passes to the block 136 previously described.

Referring again to FIG. 5A, if the block 130 determines that the defective book originally did not qualify for the lowest postal rate, then a block 150 checks to determine whether the defective book was previously reordered at the intermediate postal rate level. If this is not the case, then no adjustment to postage need be made since the defective book originally was classified in the highest postal rate level and is reordered at the same level.

On the other hand, if the block 150 determines that the book had been previously reordered at the intermediate postal rate level, then a block 152 checks to determine whether the defective book had been previously reordered and classified in the highest postal rate level. If this is the case, then again no adjustment to postage indication need be made since the book had previously been calculated in the highest postal rate level and will again be ordered at this level.

On the other hand, if the block 152 determines that the book had not been previously reordered and classified in the highest postal rate level, then a block 154 increments a "B-to-A" postal change counter in the RAM 62 for version X since the defective book originally qualified for the intermediate postal rates while the reordered book cannot so qualify.

Control from the block 154 then passes to the block 136 previously described.

Figure 6:
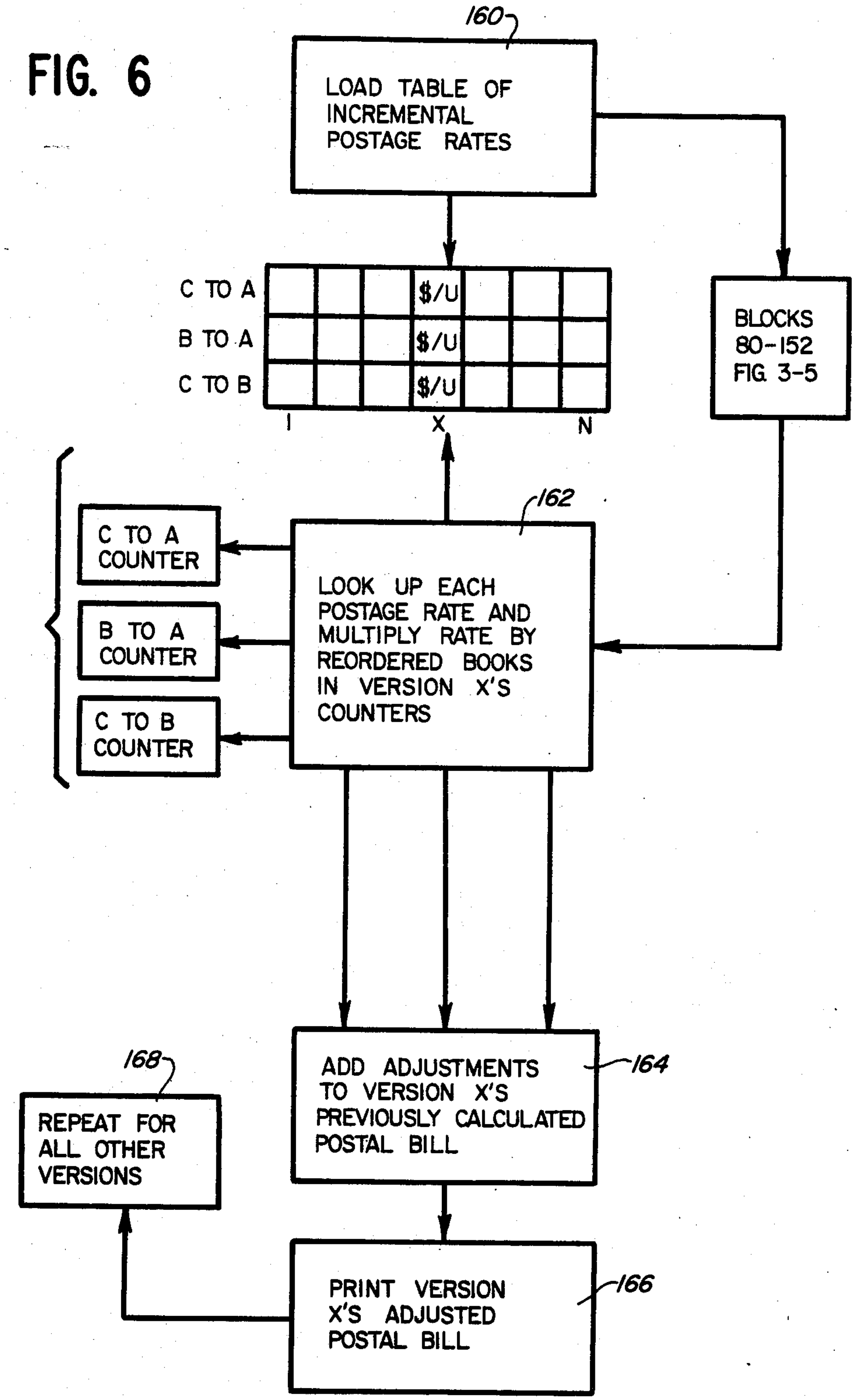
FIG. 6 is a flow diagram of steps for generating an indication of postage due to the reordering of defective books, such steps being implemented either manually or in the computer shown in FIG. 1.

Referring now to FIG. 6, there is illustrated a flow diagram of steps for calculating an indication of the increase in postage due to the reordering of defective books. The flow diagram of FIG. 6 is described under the assumption that the steps are, in the preferred embodiment, implemented in the computer 25, it being understood that such steps may be performed manually, if desired.

A block 160 loads a table of postage rates into memory locations in the RAM 62. Generally, the table is segregated according to version and according to the incremental postage rate for each change between postage rate levels. For example, for version X, three figures are stored representing the dollar increase for a change in classification for a book between the lowest and intermediate postage levels, the lowest and highest postage levels and the intermediate and highest postage levels. These rates are, of course, determined by the U.S. Postal Service.

Following the block 160, the blocks 80–152, shown in FIGS. 3–5, reorder the defective book and generate an indication of the increase in postage for the reordered book. A block 162 then performs a lookup procedure in the table of postage rates and the version X postal change counters and multiplies the contents of each version X counter by the appropriate increase in postage stored in the table. The block 162 then generates three postal adjustments which are added to the previously calculated postal bill for version X by a block 164.

A block 166 then causes the printer 68, FIG. 1, to print out the adjusted postal level for version X. A block 168 then repeats the steps of blocks 162–166 for the remaining versions of the production run.

The programming in the computer can be modified to calculate the extra postage required when a defective book causes an entire group of books to change postal rate level. In such a case, it is necessary to provide on the magnetic tape not only a precalculated indication of the total postage required, but also the number of pieces of each version to be mailed according to postal rate level classification. At the end of the production run, the information stored in the postal change counters can be combined with this additional information to derive an indication of total postage.

Moreover, the programming can be modified to eliminate the need for a precalculated indication of postage. In such a case, the final indication of postage would be generated after the production run, based upon the sequence in which the nondefective books were produced.

Figure 7:
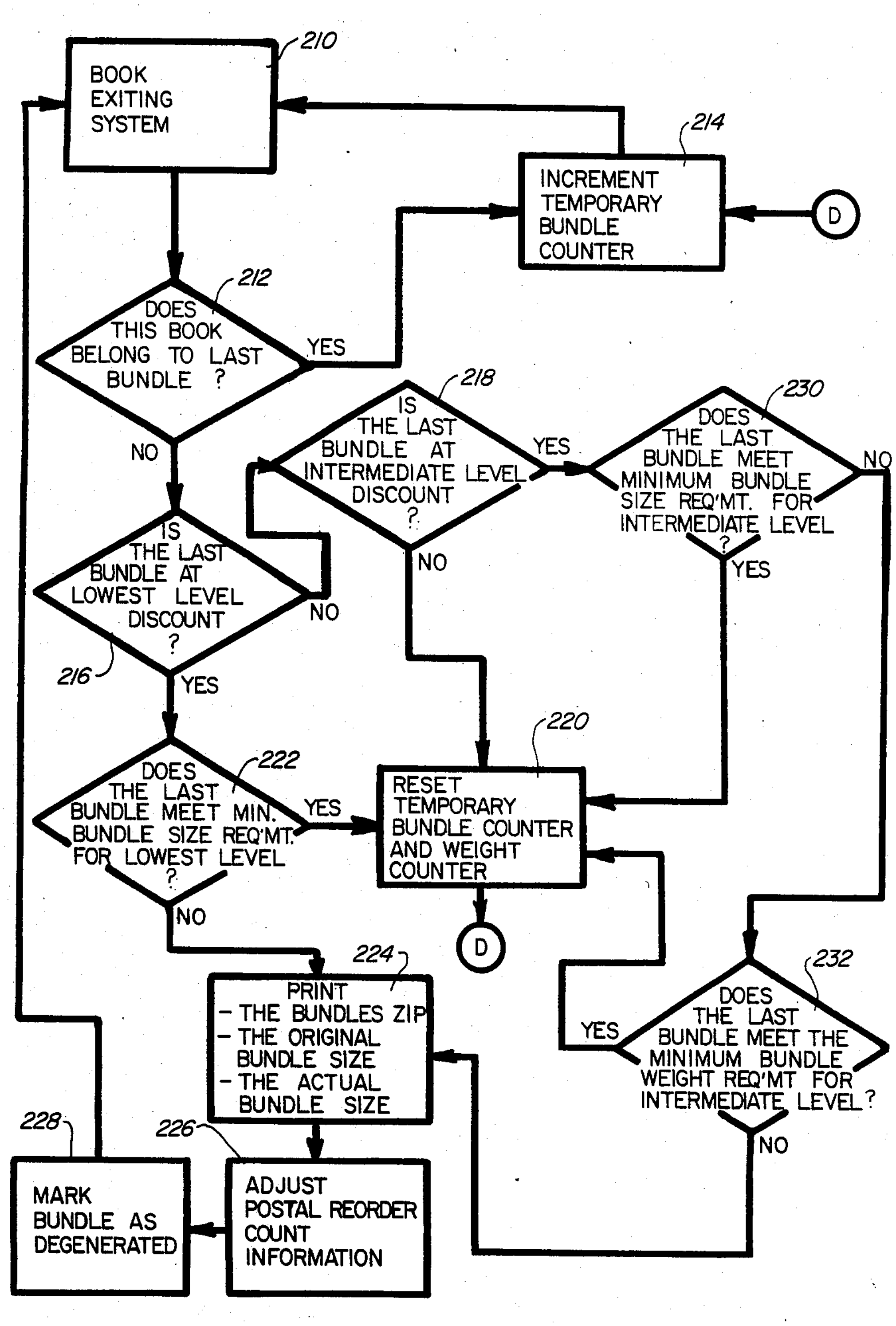
FIG. 7 is a flow chart of programming within the computer shown in FIG. 1 to detect the occurrence of a "degenerated" bundle condition.

Referring now to FIG. 7, there is illustrated the programming in the computer 25 which will detect the occurrence of a "degenerated" bundle or package. Whenever a book reaches a predetermined point in the binding system, such as when it is transported from the label printer 56 to the town sort mechanism 59 shown in FIG. 1, an interrupt is generated which causes control to pass to a block 210 which services the interrupt. A block 212 then checks a register in the RAM 62 to determine whether this book should be grouped with the "last" bundle, i.e. the most recent bundle to have exited the system. If so, control passes to a block 214 which increments a temporary bundle counter in the RAM 62.

If the block 212 determines that the book currently exiting the system does not belong with the last bundle, then the last bundle has been completed and various tests are executed to determine whether the bundle qualifies for the rate at which it was originally anticipated that it would be mailed. A block 216 checks to determine whether the last bundle was to be mailed at the lowest postal rate category. If not, a block 218 checks to determine whether the bundle was to be mailed at the intermediate level discount category. If the bundle did not originally classify for either the lowest or intermediate rates, then it has been determined that the bundle is to be sent at the highest rate and control passes to a block 220 which resets the temporary bundle counter. The block 220 also resets the weight counter which contains an indication of the weight of the bundle.

If the block 216 determines that the last bundle was originally to be mailed at the lowest postal rate, control passes to a block 222 which checks the contents of the temporary bundle counter in the RAM 62 in order to determine whether the last bundle still meets the minimum bundle size required for the lowest rate. If the bundle size is still sufficient to allow the bundle to be mailed at the lowest rate, control passes to the block 220 which, as previously noted, resets the temporary bundle counter and the weight counter.

On the other hand, if the block 222 determines that the bundle size is now insufficient to qualify for the lowest rate, control passes to a block 224 which causes the printer 68 to print out various data, such as the zip code of the last bundle, the original bundle size and the actual bundle size. A block 226 then generates a revised indication of the postage required to mail the items in the bundle, since the bundle has degenerated and hence must be mailed at a higher postal discount category. A block 228 then actuates an output device to mark the bundle as being degenerated for ready identification by personnel supervising the bundling. Control then returns to the block 210 upon receipt of the next interrupt.

If the block 218 determines that the last bundle originally qualified for the intermediate rate, a block 230 and a block 232 together determine whether the bundle can still qualify for the intermediate rate. The block 230 checks to determine whether the minimum bundle size requirement is met while the block 232 determines whether the bundle weight is greater than the minimum weight required to qualify for the intermediate rate. If one of these tests is not met, control passes to the blocks 224–228 which generate an indication of the degenerated status of the bundle.

Following the block 220, control returns to the block 214 which increments the temporary bundle counter by one. This action is necessary since the temporary bundle counter has been cleared by the block 220 after the first book in the next bundle has exited the system. Control from the block 214 then returns to the block 210 when the next interrupt is generated.

It should be noted that the programming of FIG. 7, will calculate all degenerated bundles at the highest postal rate. This aspect of the process can be modified to check to determine whether the degenerated bundle can be reordered into the intermediate postal level first and, if this is not possible, to then reorder the bundle into the highest postal level, if desired.

It should also be noted that the generation of an indication of a degenerated bundle can be utilized in other ways, such as by actuating a replacement book feeder which would feed standard books to be grouped with the other books in the bundle to permit the bundle to retain its original postal rate classification. Or, a signal can be generated or a mark applied to the bundle to allow the bundle to be diverted downstream of the town sorting mechanism 59 shown in FIG. 1 so that the bundle can be subjected to special handling.

While the present invention has been described in connection with production of books to be mailed second or third class, it should be noted that the system is equally adaptable to other postal classes in which various rates are charged depending upon how items are bundled or grouped.

What is claimed is:

1. A method of deriving an indication of the postage required to mail a plurality of books assembled by a collating system having means for assembling the books in a sequence, means for detecting a defective book, means for reordering the defective book at a later point in the sequence and means for detecting when each completed book has reached a particular point in the collating system, the method comprising:

storing an indication of the sequence in which the books are to be assembled, an anticipated number of other books with which each book is to be combined into a bundle prior to mailing thereof and an anticipated postal rate for the books in each bundle;

incrementing a bundle counter as each book reaches the particular point until the last book in a bundle reaches the particular point; and generating an indication of the postage required to mail the assembled books from the contents of the bundle counter, the anticipated number of other books and the anticipated postal rate.

2. The method of claim 1, wherein the step of generating includes the step of determining whether the contents of the bundle counter exceeds a minimum number of books required for the bundle to qualify for the anticipated postal rate.

3. The method of claim 2, wherein the step of generating includes the further step of calculating an indication of postage for each bundle based upon the anticipated postal rate if the contents of the bundle counter exceed the minimum number and upon a rate higher than the anticipated rate if the counter contents do not exceed the minimum number.

4. The method of claim 2, wherein the postal rates include lowest, intermediate and highest rates and wherein the step of generating includes the step of providing a precalculated postage and increasing the precalculated postage by an amount equal to the contents of the bundle counter multiplied by the difference between the highest postal rate and the anticipated postal rate if the contents of the counter does not exceed the minimum number.

5. The method of claim 4, wherein the generating step includes the further steps of determining a bundle weight for each bundle whose anticipated postal rate is the intermediate rate and checking whether each bundle weight exceeds a specified minimum.

6. The method of claim 5, wherein the generating step includes the further step of increasing the precalculated postage amount by the difference between the highest rate and the intermediate rate and multiplying the difference by the contents of the bundle counter if the anticipated postal rate was the intermediate rate of the bundle and the bundle weight does not exceed the specified minimum.

7. The method of claim 2, including the further step of developing an indication when the content of the bundle counter does not exceed the minimum number.

8. A system for deriving an indication of the postage required to mail items gathered by a gathering system including means for gathering the items in a sequence which permits the items to be assembled into packages so that advantage can be taken of postal discounts, means for detecting a defective item and means for reordering the defective item at a point subsequent to the original point at which the defective item was gathered in the sequence, comprising:

means for developing an indication of an anticipated postal rate for each package if the gathering is accomplished without gathering of defective items and reordering of same;

means coupled to the developing means for counting the actual number of items gathered for each package;

means coupled to the counting means for determining whether the actual number of items equals or exceeds a minimum number of items required to mail the package at the anticipated postal rate; and means coupled to the determining means for providing an indication of an adjusted postal rate higher than the anticipated postal rate for each package that does not include the minimum number of items.

9. The system of claim 8, wherein the developing means includes means for storing an indication of the package in which each item is to be assembled and wherein the counting means includes means for detecting when each item reaches a particular point in the gathering system and means responsive to the storing means and the detecting means for accumulating the number of items in each package that reach the particular point.

10. The system of claim 8, wherein the packages can qualify for a lowest, an intermediate and a highest postal rate and wherein the providing means includes means for calculating an indication of the postage required for each package based upon the highest rate if the anticipated postage rate for the package is the lowest or intermediate rate and the actual number of gathered items is less than the minimum number.

11. The system of claim 10, further including means for weighing each package if the anticipated postage rate for the package is the intermediate rate and means for generating an indication of the postage required for each package based upon the highest rate if the package weight is less than a minimum weight.

12. A system for deriving an indication of the postage required to mail items gathered by a gathering system including means for gathering the items in a sequence which permits the items to be assembled into packages so that advantage can be taken of postal discounts, means for detecting a defective item and means for reordering the defective item at a point subsequent to the original point at which the defective item was gathered in the sequence, comprising:

first means for storing an indication of the anticipated postage rate for each item which would be applicable if the items are gathered in the sequence, the postage rate being a lowest, an intermediate or a highest rate;

second means for storing an indication of whether an item whose anticipated postage rate is the lowest rate could be reordered at a point in the sequence so that it can be gathered into a package with other items that qualify for the intermediate rate so that the reordered item can also qualify for the intermediate rate; and means responsive to the first and second storing means for developing an indication of the postage required to mail the items including means for calculating the actual postage for each reordered item whose anticipated postage rate is the lowest rate, the actual postage being at the intermediate rate if the items can qualify for such rate.

13. The system of claim 12 wherein the determining means includes means for calculating the postage for each item based upon the highest rate if a reordered item whose anticipated rate is the lowest rate cannot qualify for the intermediate rate.

14. The system of claim 12 wherein the developing means includes means for determining whether the weight of the package and the reordered item exceeds a maximum and means for assigning the highest postage rate to the reordered item if the weight exceeds the maximum.

* * * * *